United States Patent
Melikyan et al.

(10) Patent No.: US 9,817,297 B1
(45) Date of Patent: Nov. 14, 2017

(54) RECONFIGURABLE ATHERMAL OPTICAL FILTERS

(71) Applicant: Alcatel-Lucent, USA Inc., Murray Hill, NJ (US)

(72) Inventors: Argishti Melikyan, Murray Hill, NJ (US); Young-Kai Chen, Murray Hill, NJ (US); Po Dong, Murray Hill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/219,720

(22) Filed: Jul. 26, 2016

(51) Int. Cl.
| | | |
|---|---|---|
| *G02F 1/295* | (2006.01) | |
| *G02F 1/313* | (2006.01) | |
| *G02B 6/125* | (2006.01) | |
| *G02B 6/122* | (2006.01) | |
| *G02B 6/13* | (2006.01) | |

(Continued)

(52) U.S. Cl.
CPC .......... *G02F 1/3136* (2013.01); *G02B 6/125* (2013.01); *G02B 6/1225* (2013.01); *G02B 6/12026* (2013.01); *G02B 6/13* (2013.01); *G02F 1/3132* (2013.01); *G02F 1/3137* (2013.01); *G02B 2006/1215* (2013.01); *G02B 2006/12109* (2013.01); *G02B 2006/12145* (2013.01); *G02B 2006/12147* (2013.01); *G02B 2006/12159* (2013.01); *G02F 2001/311* (2013.01)

(58) Field of Classification Search
None
See application file for complete search history.

(56) References Cited

U.S. PATENT DOCUMENTS

| | | | |
|---|---|---|---|
| 4,781,424 A | 11/1988 | Kawachi et al. | |
| 6,393,185 B1 | 5/2002 | Deacon | |

(Continued)

FOREIGN PATENT DOCUMENTS

| | | |
|---|---|---|
| EP | 1640754 A1 | 3/2006 |
| JP | H07281041 A | 10/1995 |
| JP | H10332957 A | 12/1998 |
| JP | 2011180421 A | 9/2011 |
| JP | 2013507660 A | 3/2013 |

OTHER PUBLICATIONS

PCT Application No. PT/EP2011/054154; PCT International Search Report dated Jul. 1, 2011; 4 pages.

(Continued)

*Primary Examiner* — Sung Pak
(74) *Attorney, Agent, or Firm* — Parker Justiss, PC

(57) ABSTRACT

An apparatus comprising an optical filter located on a substrate. The optical filter including an optical splitter configured to receive an input light and an interferometer having two waveguide arms having different optical pathlengths from each other. The waveguide arms configured to receive the input light from the optical splitter. At least a portion of one of the two waveguide arms has a narrower core width than a wider core width of the other waveguide arm. The waveguide arm with the longest waveguide portion having the narrower core width has the longest total physical path-length of the two waveguide arms. At least one of the two waveguide arms having a set of discrete waveguide portions, the discrete waveguide portions of the set being connected by optical switches which are configured to tunably select from a plurality of different physical pathlengths through the discrete waveguide portions of the at least one waveguide arm.

18 Claims, 11 Drawing Sheets

(51) Int. Cl.
*G02B 6/12* (2006.01)
*G02F 1/31* (2006.01)

(56) References Cited

U.S. PATENT DOCUMENTS

| | | | | |
|---|---|---|---|---|
| 8,457,453 | B2 | 6/2013 | Lipson et al. | |
| 8,682,121 | B2* | 3/2014 | Okayama | G02B 6/12007 385/27 |
| 8,938,137 | B2 | 1/2015 | Doerr | |
| 2002/0154846 | A1* | 10/2002 | Nolan | G02B 6/10 385/14 |
| 2003/0081888 | A1* | 5/2003 | Doerr | G02B 6/12004 385/24 |
| 2006/0188193 | A1 | 8/2006 | Lenzi | |
| 2011/0102804 | A1 | 5/2011 | Lipson et al. | |

OTHER PUBLICATIONS

Xie, Jingya, et al., "Seven-bit reconfigurable optical true time delay line based on silicon integration." Optical Express, vol. 22, No. 19, Sep. 22, 2004, 9 pages.

Guha, Biswajeet, et al., "CMOS-compatible athermal silicon microring resonators," Optics Express, vol. 18, No. 4, Feb. 15, 2010, 7 pages.

Guha, Biswajeet, "Minimizing temperature sensitivity of silicon Mach-Zehnder interferometers," Optics Express, vol. 18, No. 3, Feb. 1, 2010, 7 pages.

* cited by examiner

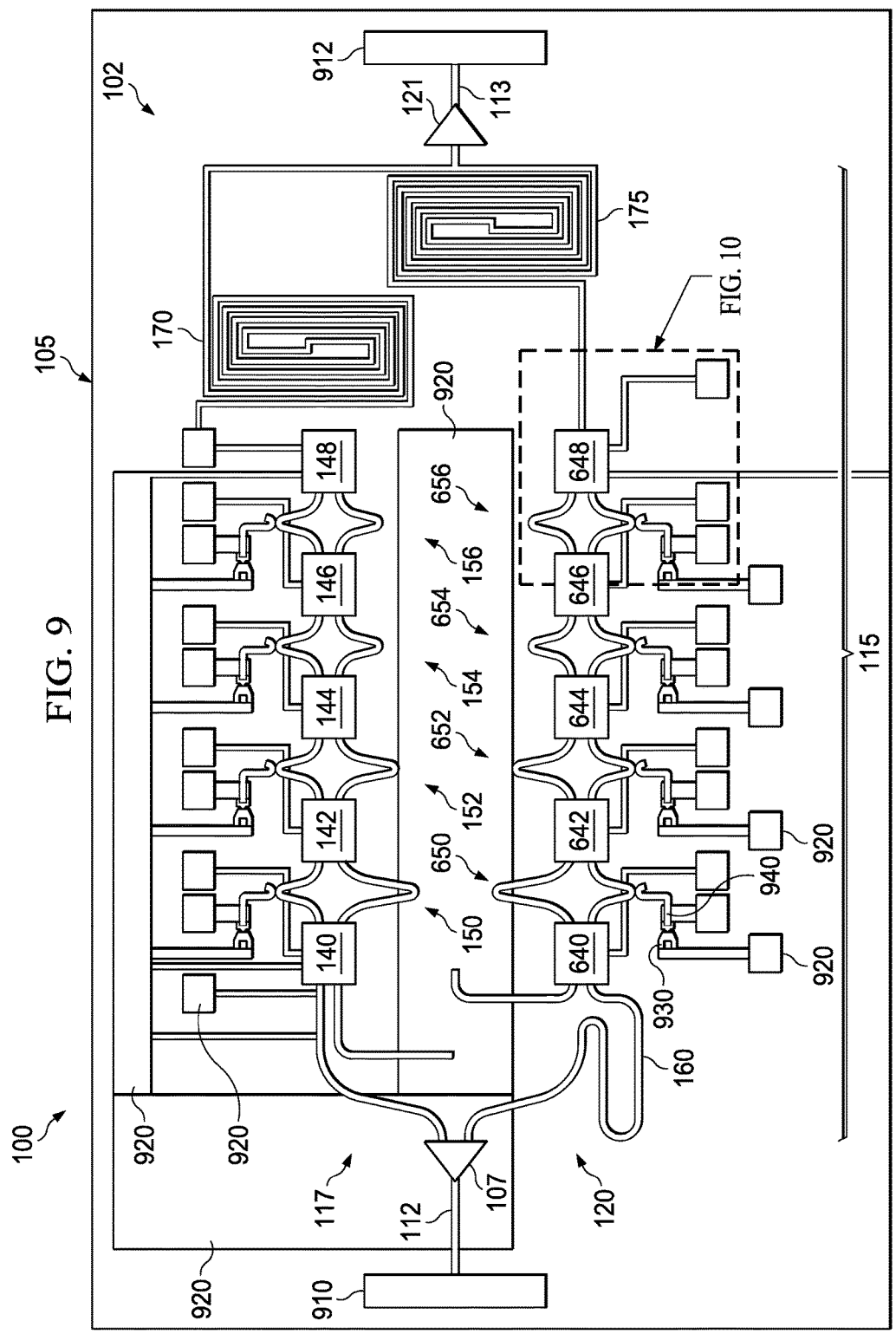

RECONFIGURABLE ATHERMAL OPTICAL FILTERS

TECHNICAL FIELD

The invention relates, in general, to apparatuses having optical filters and, more specifically, to athermal optical filters in a photonic integrated circuit apparatus, and methods of manufacturing such apparatuses.

BACKGROUND

This section introduces aspects that may help facilitate a better understanding of the inventions. Accordingly, the statements of this section are to be read in this light and are not to be understood as admissions about what is prior art or what is not prior art.

For certain optical network applications, it is desirable to lock multiple optical wavelengths to particular different channels of a grid, such as the dense wavelength division multiplexing (DWDM) standard grid channels of the International Telecommunication Union (ITU). The transmission of dense multiplexed optical carriers with carrier separations of, e.g., 50 or 25 GHz, should be closely locked to their respective dedicated optical wavelength to avoid inter-channel crosstalk.

Sometimes, wavelength locking is achieved using a reference Fabry-Perot etalon along with complex temperature measurement and feedback adjustment circuitry to achieve thermo-optic tuning. Sometimes, the etalon is made of quartz glass due to its small thermo-optic coefficient and linear thermal expansion coefficient. The construction of such a reference etalon on silicon photonic integrated circuits (PICs) can be problematic, however, due to the large thermo-optic coefficients of silicon which makes the temperature stabilization problematic. The integration of quartz glass Fabry-Perot etalons on a PIC also may not be attractive because of the relatively large dimensions of such etalons.

Attempts to provide laser locking using silicon interferometer or ring filter designs are subject to fabrication variations and may require aggressive active thermo-optic tuning procedures due to the large thermo-optic coefficient of silicon. The use of passive athermal filter designs may provide a means to eliminate or reduce such active stabilization requirements. For instance, certain interferometer filter designs, where the two arms of the interferometer have different waveguide widths, have been shown to exhibit athermal behavior in a particular wavelength range.

SUMMARY

One embodiment is an apparatus comprising an optical filter located on a substrate. The optical filter can include an optical splitter configured to receive an input light and an interferometer having two waveguide arms having different optical path-lengths from each other. The waveguide arms can be configured to receive the input light from the optical splitter. At least a portion of one of the two waveguide arms can have a narrower core width than a wider core width of the other waveguide arm. The waveguide arm with the longest waveguide portion having the narrower core width can have the longest total physical path-length of the two waveguide arms. At least one of the two waveguide arms can have a set of discrete waveguide portions, the discrete waveguide portions of the set being connected by optical switches which are configured to tunably select from a plurality of different physical path-lengths through the discrete waveguide portions of the at least one waveguide arm.

In some such embodiments, a first waveguide arm of the two waveguide arms can be the waveguide arm having the set of discrete waveguide portions and a second waveguide arm of the two waveguide arms can have the narrower core width which also can have the longest waveguide portion having the narrower core width.

In some such embodiments, a first waveguide arm of the two waveguide arms can be the waveguide arm having the set of discrete waveguide portions. The first waveguide arm can have the longest waveguide portion having the narrower core width. A second waveguide arm of the two waveguide arms can have a first portion having the narrower core width and a second portion having the wider core width In any such embodiments, the set of discrete waveguide portions can include a first pair of the discrete waveguide portions. In some embodiments, the set of discrete waveguide portions can further include multiple different pairs of discrete waveguide portions that are series connected together by different pairs of the optical switches. In some such embodiments, each one of the pairs of discrete waveguide portions of the sets can include a first portion having a same first physical path-length and a second portion having a unique second physical path-length that can be greater than the same first physical path-length and different from the second light path-lengths of other ones of the pairs of the sets.

In any such embodiments, the other of the two waveguide arms can include a second set of discrete waveguide portions, the discrete waveguide portions of the second set connected together by different optical switches which can be configured to tunably select from one of a plurality of different physical path-lengths through the discrete waveguide portions of the other waveguide arm. In some such embodiments, the second set of discrete waveguide portions further includes multiple different pairs of the discrete waveguide portions that are series connected together by different ones of the optical switches.

In any such embodiments, the wider core width can have a width value in a range from about 300 to about 500 nanometers and the narrower core width can have a width value that is in a range from about 0.4 to about 0.6 times a value of the wider core width.

In any such embodiments, the waveguide arm with the longest total physical path-length of the two waveguide arms can include a first fixed extension portion that provides at least half of the total physical path-length difference between the waveguide arm and the other waveguide arm. In some such embodiments, the first fixed extension portion can provide from greater than about 50 percent to about 100 percent of the total physical path-length difference between the waveguide arm with the longest total physical path-length and the other waveguide arm.

In any such embodiments, the two waveguide arms each can include second fixed extension portions that have substantially a same physical path-length and that can contribute at least half total physical path-lengths of the respective arms. In some such embodiments, the same physical path-length of the second fixed extension portions can contribute a percentage value ranging from greater than about 50 percent to about 90 percent of the total physical path-length of the respective arms.

Any such embodiments can further including a light input coupled to the optical filter, the light input and the optical filter located on a photonic integrated circuit substrate and the light input can be configured to deliver the input light having a wavelength in an optical telecommunication band to the optical splitter. In some such embodiments, the light input can includes an optical coupling port or a light source. Some such embodiments can further include discrete electrodes on the photonic integrated circuit substrate, the discrete electrodes coupled to each of the optical switches, wherein each of the electrodes can be configured provide an electrical signal to control a direction of transit of the input light through one of the discrete waveguide portions.

Another embodiment is method comprising fabricating an optical filter. Fabricating the optical filter can include providing a substrate, providing an optical layer on the substrate and patterning the optical layer to form an optical filter. Patterning can include forming an optical splitter configured to receive an input light and forming an interferometer having two waveguide arms with different optical pathlengths, the waveguide arms configured to receive the input light from the optical splitter. At least a portion of one of the two waveguide arms can have a narrower core width than a wider core width of the other waveguide arm. The waveguide arm with the longest waveguide portion having the narrower core width can have the longest total physical path-length of the two waveguide arms. At least one of the two waveguide arms can have a set of discrete waveguide portions, the discrete waveguide portions of the set being connected by optical switches which are configured to tunably select from a plurality of different physical pathlengths through the discrete waveguide portions of the at least one waveguide arm.

In some such embodiments, patterning to form the optical filter can include patterning the other of the two waveguide arms to form a second set of discrete waveguide portions, the discrete waveguide portions of the second set connected together by different optical switches which can be configured to tunably select from one of a plurality of different physical path-lengths through the discrete waveguide portions of the other waveguide arm.

Any such embodiments can further include providing a light input on the substrate, the light input can be configured to deliver the input light having a wavelength in an optical telecommunication band to the optical splitter.

Any such embodiments can further include forming discrete electrodes on the substrate, the discrete electrodes coupled to the optical switches. Each of the electrodes can be configured provide an electrical signal to control a direction of transit of the input light through one of the discrete waveguide portions.

BRIEF DESCRIPTION OF THE DRAWINGS

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which:

FIG. 9 presents an example embodiment of an optical photonic circuit apparatus that includes an example optical filter analogous to that depicted in FIG. 7;

In the Figures and text, similar or like reference symbols indicate elements with similar or the same functions and/or structures.

Figure 1:
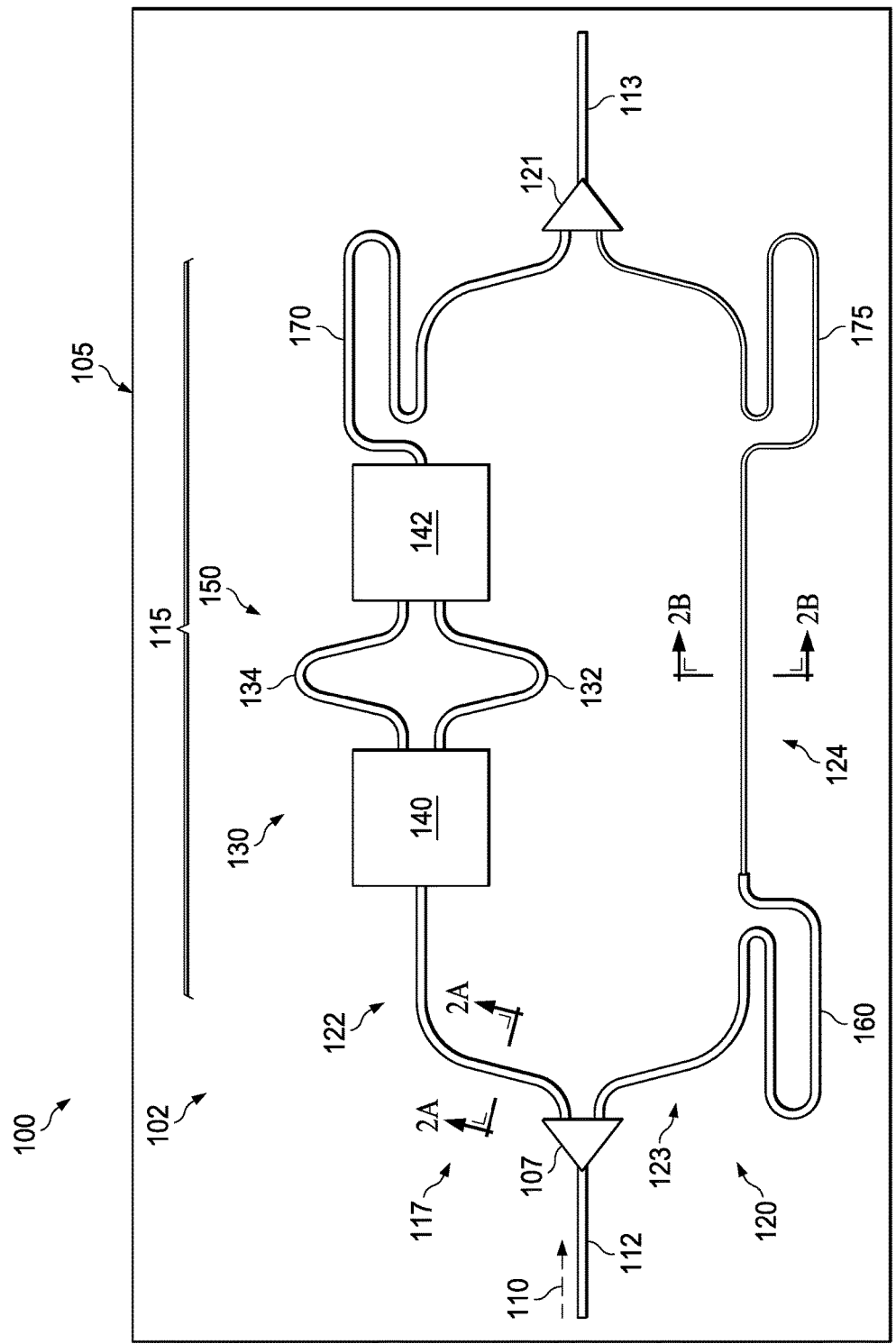
FIG. 1 presents plan view of an example apparatus that includes an embodiment of the optical filter of the present disclosure.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION

The description and drawings merely illustrate the principles of the inventions. It will thus be appreciated that those skilled in the art will be able to devise various arrangements that, although not explicitly described or shown herein, embody the principles of the inventions and are included within its scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

As part of the present disclosure, we have found that the production of certain previous passive thermally stabilized silicon interferometer filter designs can be problematic due to fabrication variations. Fabrication variations can cause the filter's dimensions to differ from a targeted design shape. Consequently, the filter may exhibit athermal behavior at a wavelength or wavelength range that is not at the desired value.

The term athermal behavior as used herein refers to an interferometer filter design such as disclosed herein where for a temperature fluctuation of ±60° K the resonance wavelength of the filter changes by ±10 picometer or less or by ±1 GHz or less away from a selected target wavelength.

While not limiting the scope of the disclosure by theoretical considerations, at least in some embodiments, the wavelength $\lambda_0$ where the athermal behavior occurs is thought to be specified by equation (1):

$$(dn_{eff}(\lambda_0)/dT)\Delta L = (d\Delta n_{eff}(\lambda_0)/dT)L \qquad (1)$$

where the $\Delta L$ equals the difference in length of the sections of the two interferometer arms having a same effective thermo-optic coefficient (e.g., a same core width in some embodiments), L is the length of the part of the waveguide arm having a different effective thermo-optic coefficient (e.g., a narrower core width in some embodiments), and, there is a corresponding part of the second waveguide arm having same length L and the wider core width, $\Delta n_{eff}$ is the effective refractive index difference of the waveguide portions that have the same wider core width versus the narrower core width. The term $n_{eff}$ is the effective index of the mode in the waveguide portions having the wider core width.

In accordance with equation (1), we have found that the wavelength where the athermal behavior occurs can be highly sensitive to the filter's waveguide geometric and material properties (e.g., dimensions, thermo-optic coefficient and/or refractive index), which in turn, can cause variations in $\Delta n_{eff}$. Slight deviation in the fabrication processes away from the target waveguide dimensions, in particular, variations in the waveguide's width and/or height, can result in athermal behavior occurring at the wavelength that is not at the target wavelength. The sensitivity to the filter's waveguide dimensions were found to be problematic for filters designed to provide a desired constant (e.g., 100 GHz or less variation) free spectral range (FSR) because such filters can require long physical lengths of L (e.g., 8000 to 10000 microns in some embodiments).

For instance, small variations (e.g., from ±5 percent to ±1 percent, or, from ±25 nanometers to ±5 nanometers, for some embodiments) in the core width of one or both waveguide arms of the filter can cause the filter's athermal behavior to occur at a wavelength, or in a wavelength range, whose location relative the ITU grid of channels is unpredictable. Additionally, because of the long lengths of the interferometer waveguide arms, it can be difficult to achieve the desired constant FSR (e.g., 25, 50 or 100 GHz in some embodiments) throughout the entire wavelength range of a target telecommunication band. Consequently, photonic integrated circuits having such athermal filter designs are fabricated in lower yields than desired, e.g., in batch fabrication runs on silicon wafers.

To address this problem, as disclosed herein, we have developed an optical filter design architecture that allows the above-mentioned problems associated with fabrication variations to be mitigated. By providing reconfigurable waveguide portions in at least one, and sometimes both, of the interferometer waveguide arms with different thermo-optic coefficients (e.g. different core widths), fabrication variations can be compensated for by tuning the relative physical path-lengths of light traveling through the waveguide arms by switching among different waveguide portions. Having such tunably adjustable waveguide physical path-lengths allows the mitigation of fabrication variations to be done on a circuit-by-circuit basis thereby increasing the yield of useable circuits per fabrication run.

One embodiment is an apparatus. FIG. 1 presents a perspective view of an example embodiment apparatus 100 of the present disclosure. The apparatus 100 comprises an optical filter 102 located on a substrate 105. The optical filter 102 includes an optical splitter 107 (e.g., a 50:50 power splitter) configured to receive an input light 110 (e.g., via waveguide 112). The optical filter 102 also includes an interferometer 115 having two waveguide arms (e.g., a first waveguide arm 117 and a second waveguide arm 120) having different optical path-lengths from each other.

For the purposes of the present disclosure, the waveguide arms 117, 120 are defined as including the entire physical waveguide structures located between the splitter 107 and the combiner 121 including any wider or narrower core width portions of the waveguide arms or optical switches as further described herein.

The term, optical path-length, refers to the product of the effective refractive index ($n_{eff}$) of the waveguide material and the physical path-length of the waveguide.

The waveguide arms 117, 120 are configured to receive the input light 110 from the optical splitter 107 (e.g., each arm receiving 50 percent power portions of the light when the splitter is a 50:50 splitter). After passing through the arms 117, 120, the light is recombined at an optical combiner 121 configured to receive light from the waveguide arms 117, 120.

Embodiments the optical filter 102 are described herein with the convention of the input light 110 entering the filter 120 via the splitter 107 and exiting the filter 120 via the combiner 121. Such embodiments, however, also would work equally well for an inverse convention, where the light 110 enters the filter 102 via a splitter 121 (e.g., via waveguide 113) and exits via a combiner 107.

Figure 2A:
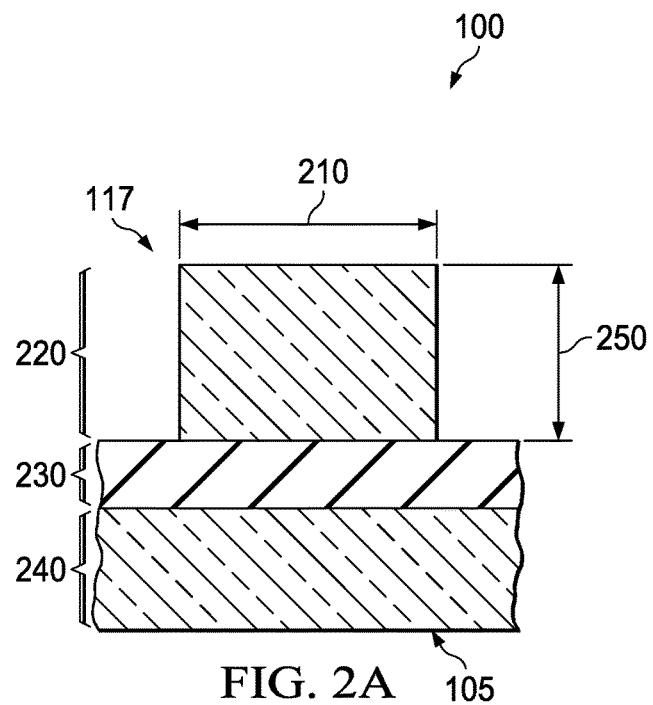
FIG. 2A presents a cross-sectional view of a portion of a first waveguide arm of an interferometer of the example optical filter shown in FIG. 1 along view line 2A.
Figure 2B:
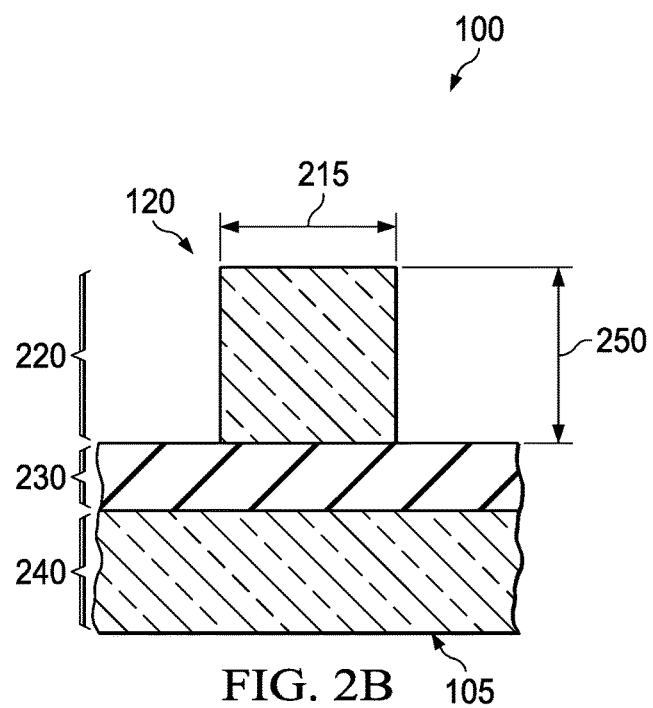
FIG. 2B presents a cross-sectional view of a portion of a second waveguide arm of the interferometer of the example optical filter shown in FIG. 1 along view line 2B.

At least a portion of one of the two waveguide arms has a narrower core width than a wider core width of the other waveguide arm. For instance, as shown in FIG. 1, the first waveguide arm 117 has a wider core width. For instance, FIG. 2A presents a cross-sectional view of a portion 122 of the first waveguide arm 117, along view line 2A in FIG. 1, having the wider core width 210. For instance, FIG. 2B presents a cross-sectional view of a portion 124 of the second waveguide arm 120 along view line 2B. As shown in FIG. 1, the second waveguide arm 120 can have a first portion 123 that has the same wider core width, and, a second portion 124 can have a narrower core width 215 such as shown in FIG. 2B.

Figure 3:
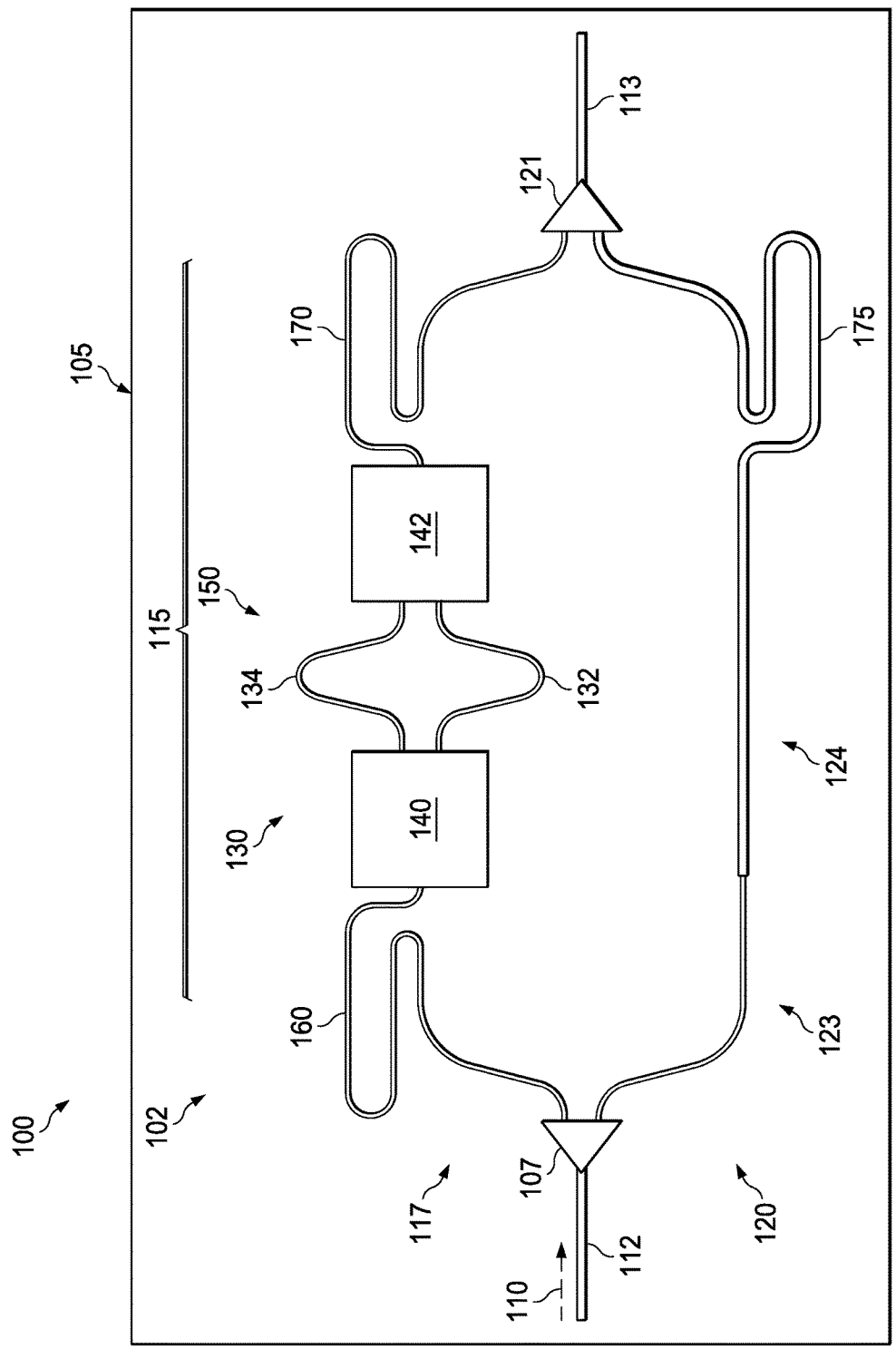
FIG. 3 presents a plan view of another example apparatus that includes another embodiment of the optical filter of the present disclosure, analogous to the apparatus shown in FIGS. 1-2B.

The waveguide arm with the longest waveguide portion having the narrower core width also has the longest total physical path-length of the two waveguide arms. For instance, as illustrated in FIG. 1, the second waveguide arm 120 of the two waveguide arms has the narrower core width 215 and the second waveguide arm 120 also has the longest waveguide portion having the narrower core width (e.g., portion 124). Therefore the second waveguide arm 120 has the longest total physical path-length of the two waveguide arms. For instance, as illustrated in FIG. 3, the second waveguide arm 120 has a first portion 123 having the narrower core width 215 and a second portion 124 having the wider core width 210. But, since substantially the entire length of the first waveguide arm 117 has narrower core width, this is the arm with the longest waveguide portion having the narrower core width. Therefore in this filter embodiment the first waveguide arm 117 has the longest total physical path-length of the two waveguide arms.

At least one of the two waveguide arms has a set of discrete waveguide portions, the discrete waveguide portions of the set being connected by optical switches which are configured to tunably select from a plurality of different physical path-lengths through the discrete waveguide portions of the at least one waveguide arm. For instance, as illustrated in FIG. 1 or 3, the first waveguide arm 117 has a set 130 of discrete waveguide portions (e.g., at least portions 132, 134). The discrete waveguide portions 132, 134 of the set 130 are connected by optical switches (e.g., first and second optical switches 140, 142). The optical switches 140, 142 are configured to tunably select from a plurality of different light path-lengths through the discrete waveguide portions 132, 134 of the first waveguide arm 117.

As illustrated in FIGS. 2A and 2B, some embodiments of the waveguide arms 117, 120 can be surrounded by an air cladding. In other embodiments, as familiar to those skilled in the pertinent arts, the waveguide arms 117, 120 can be surrounded by a material cladding (e.g., a silicon oxide cladding).

In some embodiments, the interferometer 115 can be or include a Mach Zehnder interferometer (MZI) located on a planar silicon-on-insulator (SOI) substrate 105. The arms 117, 120 of the interferometer 115 and other light-guiding components of the apparatus 100 can be composed of an upper silicon layer of the SOI substrate 105. However, in other embodiments, these light guiding components could be composed of high-index-contrast waveguides such as, but not limited to, bulk silicon, silicon-nitride or InP. Example embodiments of the optical switches include Micro-Electro-Mechanical System or MZI switches. One skilled in the pertinent arts would be familiar with other possible embodiments of the optical switch. One skilled in the art would understand how the optical switch 140 could be configured with a suitable number of input and output ports (e.g., 1×2, 1×3, 1×4, 2×2, 1×2, 1×3, 1×4 . . . switches) and port switch control electrodes to accomplish the tunable selection of one of the different light paths through one of the discrete waveguide portions 132, 134.

Figure 4:
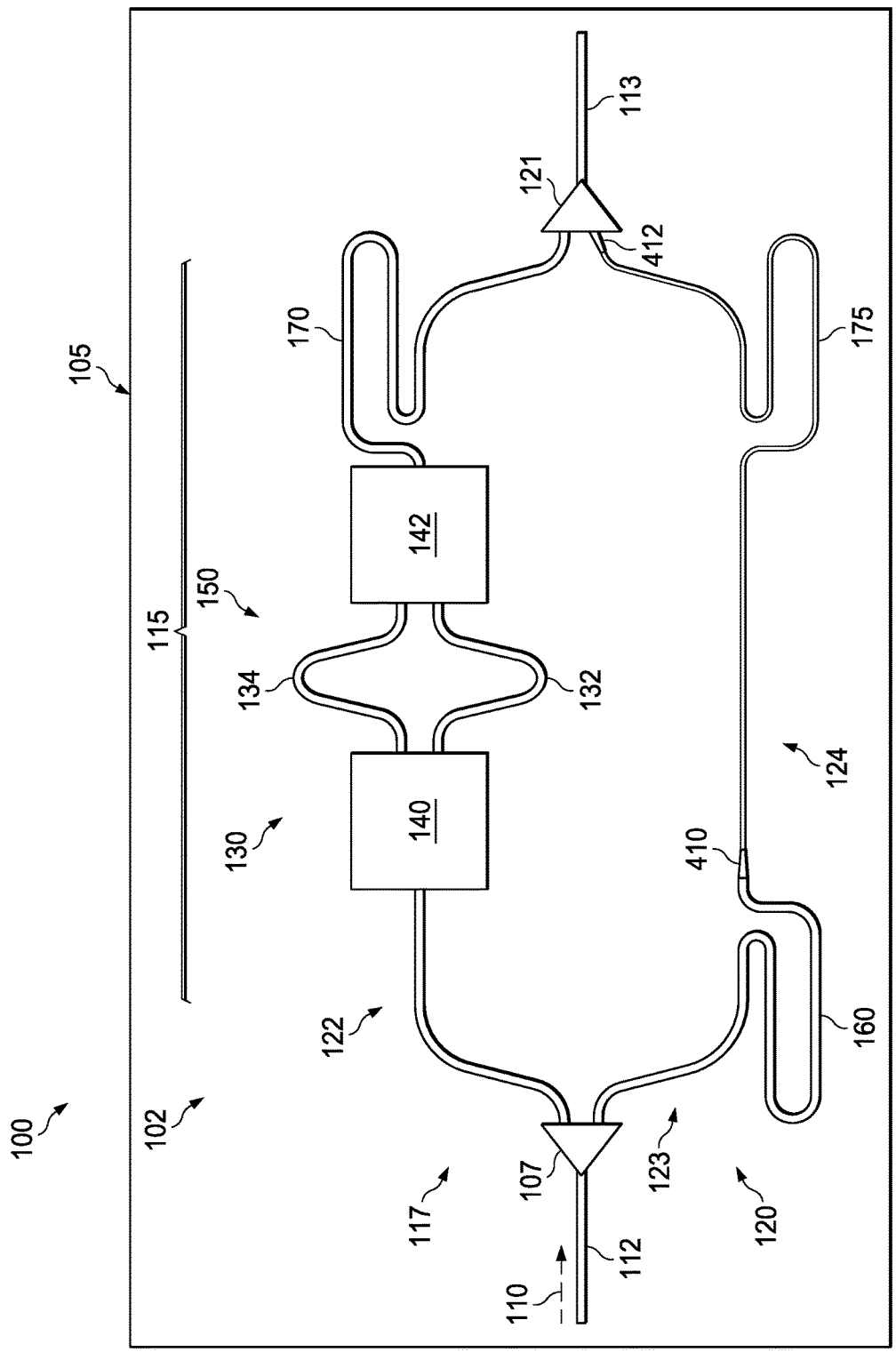
FIG. 4 presents a plan view of another example apparatus that includes another embodiment of the optical filter of the present disclosure, analogous to the apparatus shown in FIGS. 1-2B.
Figure 5:
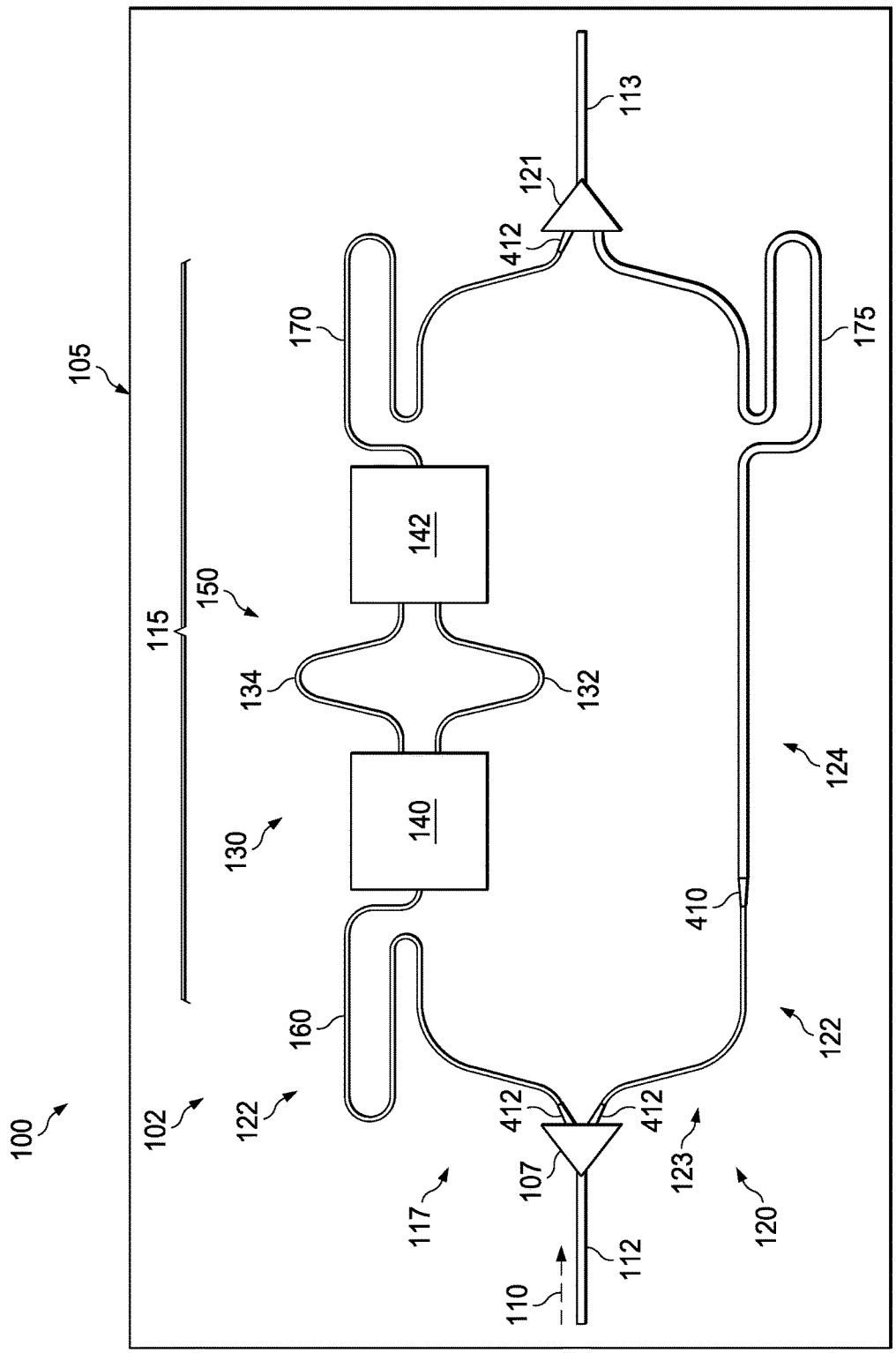
FIG. 5 presents a plan view of another example apparatus of the present disclosure, analogous to the apparatus shown in FIGS. 1-2B.

In some embodiments, such as illustrated in FIG. 4, to facilitate efficient light transfer, the first fixed length waveguide portion 123 having the wider first core width 210 can be connected to the second fixed length portion 124 having the narrower second core width 215 by a tapered waveguide portion 410. In such embodiments, the tapered portion can have a core width that gradually transitions from the wider width of the first length portion 123 to the narrower width of the second length portion 124. Likewise, in some embodiments, the second fixed length portion 124 of the second waveguide arm 120 can be connected to the combiner 121 by second tapered waveguide portion 412 transiting from the narrower width of the second length portion 124 to an input port of the combiner 121 that has a wider width. Similarly, as illustrated in FIG. 5, when the first length portion 123 of the second waveguide arm 120 has a narrower core width and the second length portion 124 has the wider core width, then the tapered waveguide portion 410 can taper from the narrower width of the first length portion 123 to the wider width of the second length portion 124. Similarly second tapered portions 412 can connect the waveguide arm 117 and portion 123 with the narrower core width to the splitter 107 and/or combiner 121.

As illustrated in FIGS. 1 and 2-4, for some embodiments of the interferometer 115, the set 130 of discrete waveguide portions includes a first pair 150 of discrete waveguide portions 132, 134. As illustrated in FIG. 1, the first waveguide portion 132 can have a shorter physical length (e.g., length L1) as compared to the second waveguide portion (e.g., length L1+ΔL1) of the pair 150. For some such embodiments, the first optical switch 140 can be configured as a 1×2 switch and the second optical switch 142 can be configured as a 2×1 switch. In such embodiments, the optical switches 140, 142 can be configured to select from the different light path-lengths through the discrete waveguide portion 132 or the discrete waveguide portion 134.

Figure 6:
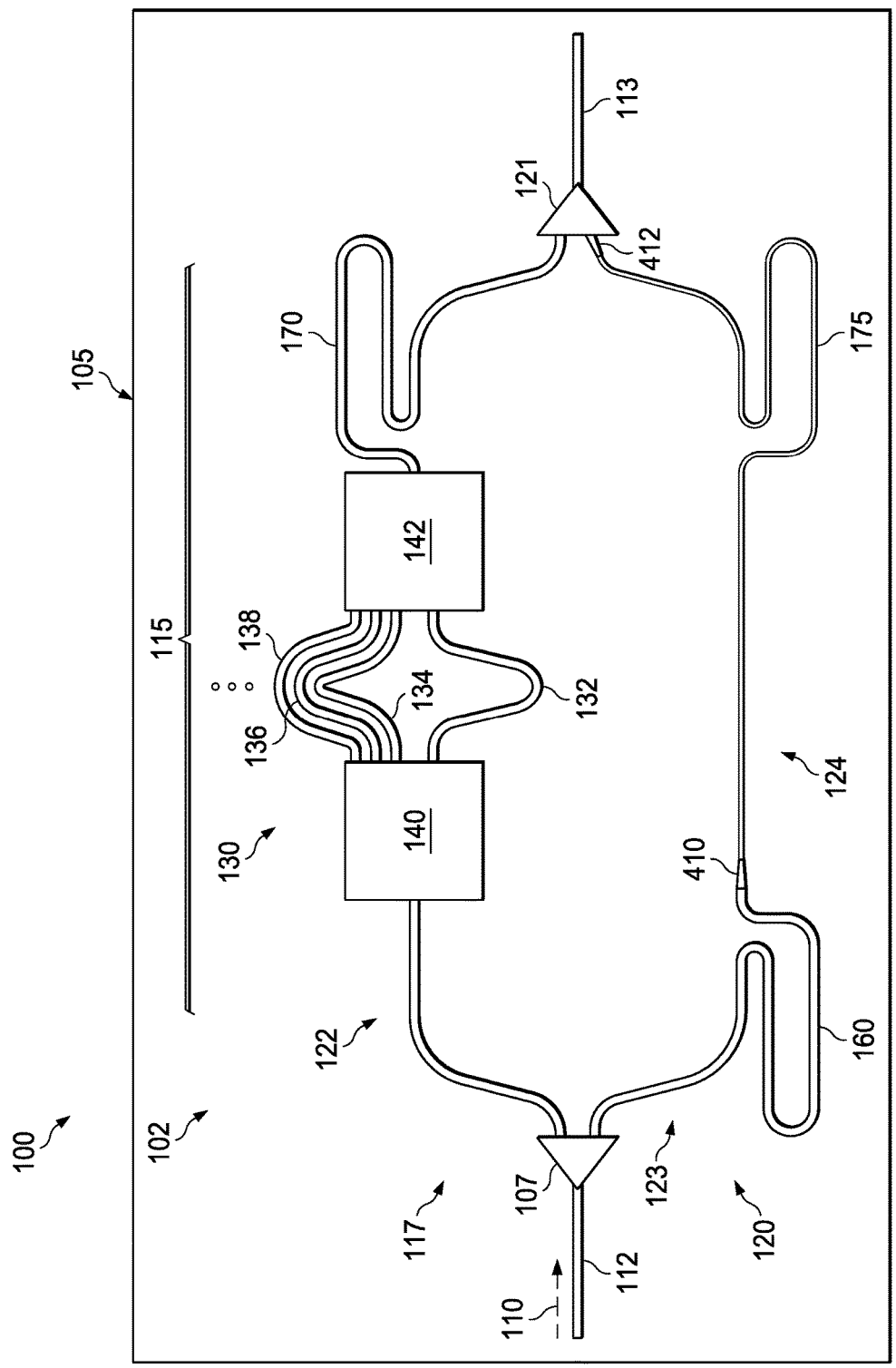
FIG. 6 presents a plan view of another example apparatus that includes another embodiment of the optical filter of the present disclosure, analogous to the apparatus shown in FIGS. 1-2B.

In other embodiments, to provide higher degrees of incremental tunable optical light delays while occupying substantially the same area of the substrate 105, the set 130 can further include multiple ones of the discrete waveguide portions that are all connected in parallel to the same two optical switches 140, 142. For instance, as illustrated in FIG. 6, the set 130 can include a third discrete waveguide portion 136 or third and fourth discrete waveguide portions 126, 138, to form a trio 150 or quartet 150 or higher numbers of discrete waveguide portions. Each of the waveguide portions 132, 134, 136, 138 . . . can have different physical light path-lengths (e.g., L1, L1+ΔL1, L1+2ΔL1, L1+4ΔL1, . . . , respectively) which are tunably selectable by the first optical switch 140 (e.g., a 1×3 or 1×4 switch etc. . . . ) and the second optical switch 142 (e.g., a 3×1 or 4×1 . . . switch etc. . . . ). In such embodiments, the optical switches 140, 142 could be configured to select from the different physical path-lengths through one of the discrete waveguide portions 132, 134, 136, 138 of the set 130.

Figure 7:
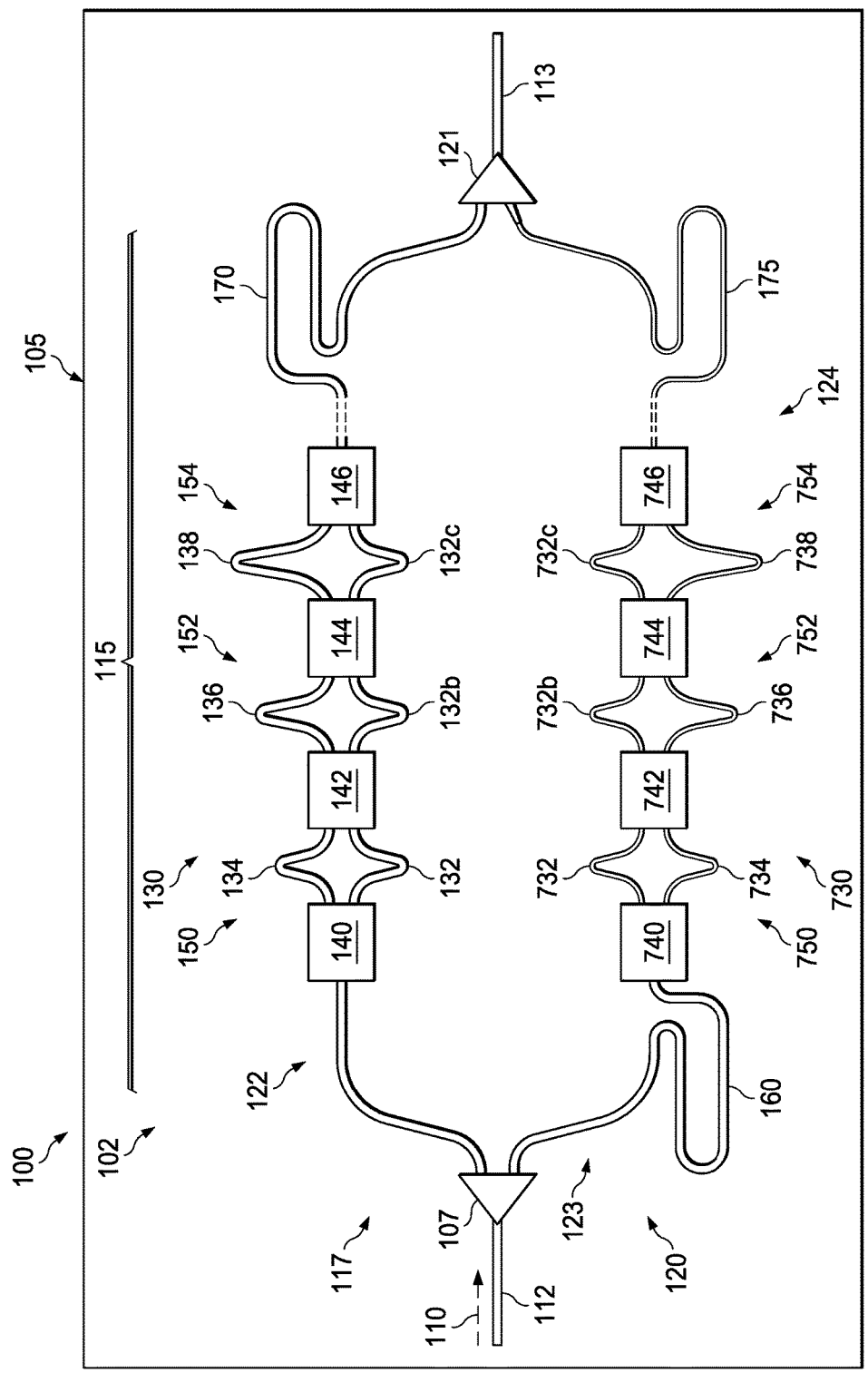
FIG. 7 presents a plan view of another example apparatus that includes another embodiment of the optical filter of the present disclosure, analogous to the apparatus shown in FIGS. 1-2B.

In still other embodiments, to provide more degrees of incremental tunable optical light delays, as illustrated in FIG. 7, the set of discrete waveguide portions 130 can further include multiple different pairs 150, 152, 154, . . . of discrete waveguide portions. For example, the interferometer 115 can include a first pair 150 of waveguide portions 132, 134, a second pair 152 of waveguide portions 132b, 136, and a third pair 154 of portions 132c, 138, that are series connected together by different pairs of the optical switches 140, 142, 146, 148, . . . (e.g., switches 140, 142 connecting a first pair 150, switches 142, 146 connecting a second pair 152 and switches 146, 148 connecting a third pair 154). In such embodiments, the first pair of optical switches 140, 142 can be configured to select from the different light path-lengths through one of the discrete waveguide portions 132, 134, the second pair of optical switches 142, 144 can be configured to select from the different light path-lengths through one of the discrete waveguide portions 132b, 136, and so on.

For instance as further illustrated in FIG. 7, in some embodiments, each one of the pairs 150, 152, 154 of discrete waveguide portions of the set 130 can include a first portion having a same first light path-length (e.g., waveguide portion 132, 132b, 132c, . . . , e.g., each of length L1) and a second portion (e.g., one of waveguide portions 134, 136 or 138) having a unique second light path-length (e.g., one of lengths L1+ΔL1, L1+2ΔL1, or L1+4ΔL1, respectively) that is greater than the same path-length (e.g., greater than L1) and different from the second light path-lengths of other ones of the pairs of the set 130. For instance, the path-length of the second portion 134 of the first pair 150 can be greater than the path-length of the first portion 132 and also have a different path-length than the path-lengths of either of second portions 136 or 138 of the second and third pairs 152, 154.

In some such embodiments, for the pairs 150, 152, 154 the same first waveguide portions 132, 132b, 132c, . . . can have a same physical path length equal to L1 where L1 has a value in a range from about 50 to about 100 microns. In such embodiments, the second unique second waveguide portion 134 has a physical path-length equal to L1+ΔL1, where ΔL1 has a value in a range from about 25 to about 50 microns and in other embodiments from about 50 to about 100 microns. In some such embodiments, for the second pair 152, the unique second waveguide portion 136 can have a physical path-length equal to L1+2ΔL1, and for the third pair 154 the unique second waveguide portion 138 can have a physical path-length equal to L1+4ΔL1.

Based on the present disclosure, one skilled in the pertinent art would understand how embodiments of the apparatus 100 could have various combinations of the filter designs presented in FIGS. 6 and 7, e.g., to provide the additional degrees of incremental tunable optical light delays, Some embodiments, for instance, can include different pairs of discrete waveguide portions connected in series by different pairs of optical switches where there are more than two pairs of tunable waveguide portions connected by the same pairs of optical switches (e.g., to include additional third and fourth waveguide portions 136 and 138 shown in FIG. 6).

In some embodiments, the other of the two waveguide arms includes a second set of discrete waveguide portions, the discrete waveguide portions of the second set connected together by different optical switches which are configured to tunably select from one of a plurality of different physical path-lengths through the discrete waveguide portions of the other waveguide arm. Such embodiments can provide additional degrees of incrementally tunable optical light delays.

For example, as illustrated in FIG. 7 as part of the second waveguide arm, in addition to discrete waveguide portions that are part of the first waveguide arm, the second waveguide arm can include other discrete waveguide portions. For instance, the portion 124 of the second waveguide arm 120 having the second core width 215, also includes a second set 730 of discrete waveguide portions 732, 734, 736.

The discrete waveguide portions of the second set 730 are connected together by different optical switches 740, 742, 744, . . . analogous to that described for the first set 130. The optical switches 740, 742, 744, . . . connected to the second set 730 are configured to tunably select from one of a plurality of different path-lengths through the discrete waveguide portions (e.g., a light path through one of waveguide portions 732, 734, 736, . . . ) of the second waveguide arm 120.

As illustrated in FIG. 7, in some embodiments, analogous to that described for first set 130, the second set 730 can include a pair 750 of discrete waveguide portions, and in some embodiments, includes different pairs 750, 752, 754, . . . of the discrete waveguide portions (e.g., a first pair 750 including waveguide portions 732 and 734, a second pair 752 including waveguide portions 732b and 736, . . . ) that are series connected together by different ones of the optical switches between each of the pairs of discrete waveguide portions (e.g., switches 740, 742, . . . respectively). The different optical switches 740, 742, . . . can be configured to tunably select from different physical light path-lengths through the discrete waveguide portions of the second waveguide arm 120 analogous to that described herein in the context of the first waveguide arm 117.

In still other embodiments, analogous to embodiments the first waveguide arm 117 discussed in the context of FIG. 6, one of more of the pairs of discrete waveguide portions 150, 152, 154 . . . can further include third, fourth or additional discrete waveguide portions connected to the same pair optical switches coupled to the second waveguide arm 120 to form trios, quartets or higher combinations of such discrete waveguide portions.

In some embodiments of the interferometer 115 where both the first and second arms 117, 120 include tunable discrete waveguide portions, the discrete waveguide portions of the second waveguide arm can have same physical path-lengths as corresponding ones of the pairs of discrete waveguide portions of the first waveguide arm. Having such identically configured tunable waveguide portions in both arms advantageously reduces design complexity because athermal filter is based on waveguide geometry and if the tunable waveguide portions are present in only one waveguide arm then the thermal behavior of those tunable portions needs to be taken into account.

For example, as illustrated in FIG. 7, for some such embodiments, each one of the different pairs 750, 752, 754 of discrete waveguide portions 732, 734, 736, . . . of the second waveguide arm 120 includes a first same waveguide portion (e.g., waveguide portion 732, 732b, 732c, . . . ) that are equal in physical path-length to each other and equal in physical-path length to the corresponding first same waveguide portions of the first waveguide arm 117 (e.g., waveguide portions 132, 132b, 132c, . . . ). And, the second waveguide portions (e.g., waveguide portion 734, 736, 738, . . . ) of the pairs 750, 752, 754 have unique physical path-lengths within the second arm 120 but the same physical path-lengths corresponding second waveguide portions of the first waveguide arm 117 (e.g., same physical light path-lengths as the waveguide portions 134, 136, 138, . . . , respectively).

Figure 8A:
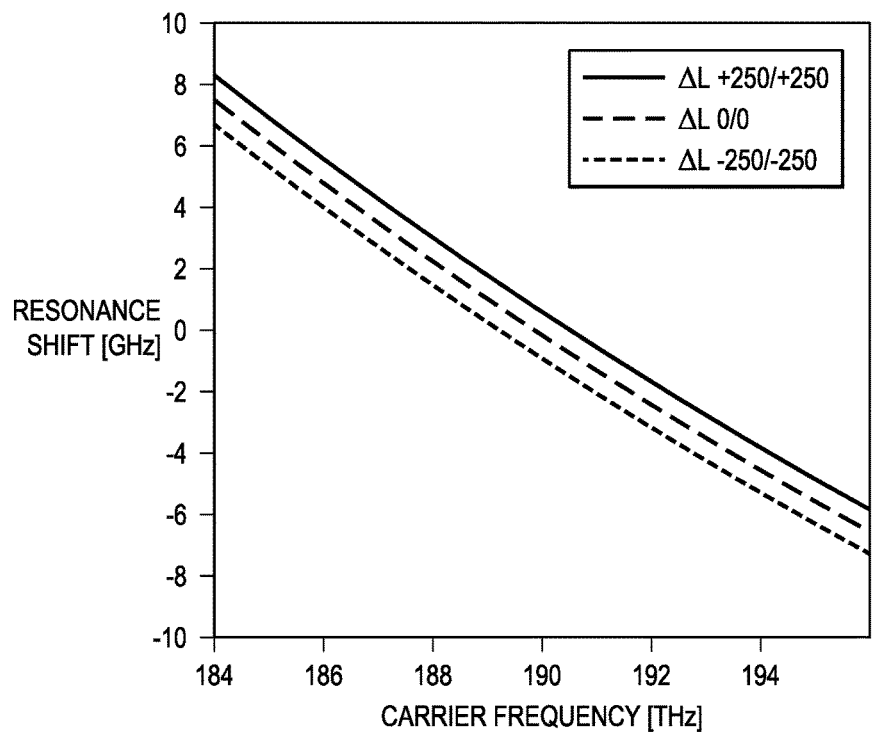
FIG. 8A presents exemplary resonance shift versus carrier frequencies curves for a temperature change of 10° K for an example apparatus, analogous to the apparatus depicted in FIG. 7, where the physical path-lengths in the first arm and second arm correspond to a reference physical path-length for a selected combination of the plurality of the different physical path-lengths ($\Delta L$ 0/0), and, the path-lengths of both the first and second arms have both been changed by a same amount to provide longer ($\Delta L$ +250) or shorter ($\Delta L$ −250) physical path-lengths.
Figure 8B:
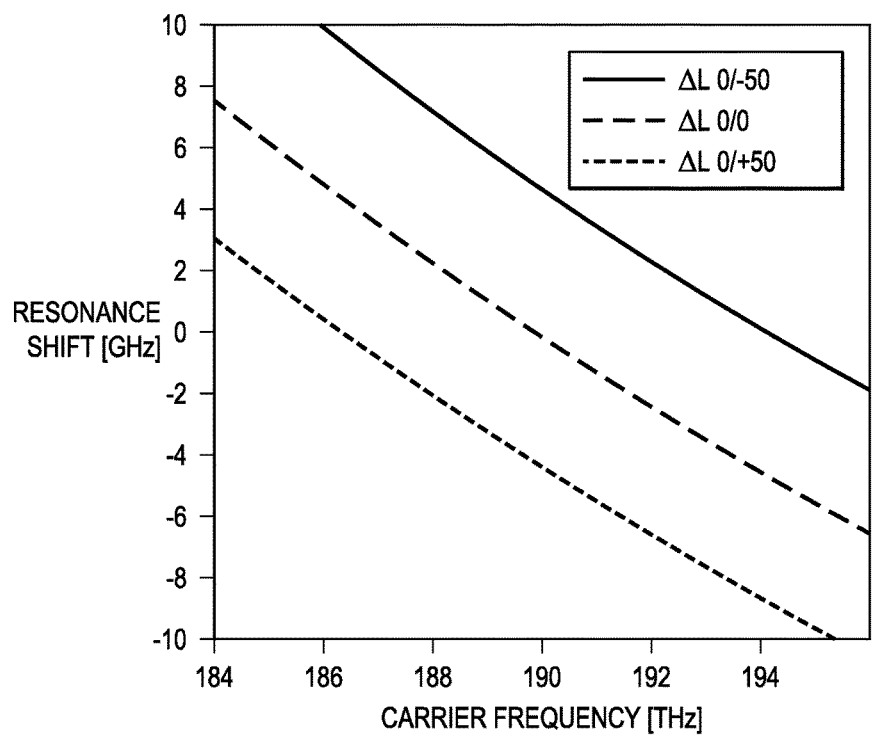
FIG. 8B presents exemplary resonance shift versus carrier frequencies curves for a temperature change of 10° K for an example apparatus, analogous to the apparatus depicted in FIG. 7, where as compared to a reference physical path-length ($\Delta L$ 0/0), the physical path-length in the first arm has not been changed and the path-length in the second arm has been changed to provide a shorter path-length ($\Delta L$ 0/−50) or a longer path-length ($\Delta L$ 0/+50)
Figure 8C:
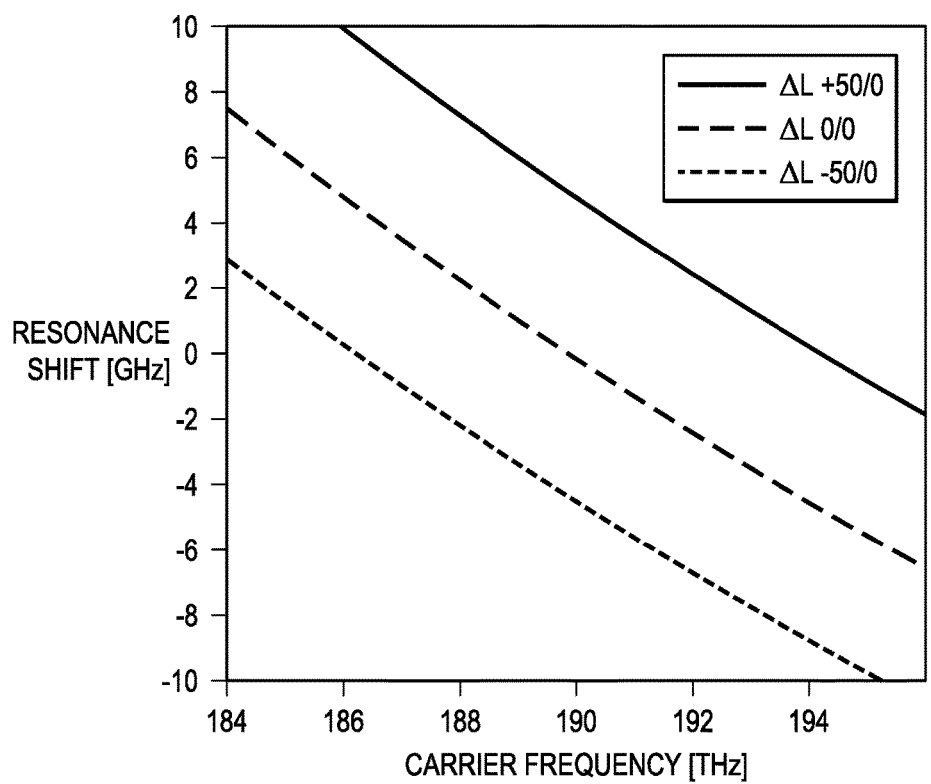
FIG. 8C presents exemplary resonance shift versus carrier frequencies curves for a temperature change of 10° K for an example apparatus, analogous to the apparatus depicted in FIG. 7, where as compared to a reference physical path-length ($\Delta L$ 0/0), the physical path-length in the second arm has not been changed and the path-length in the first arm has been changed to provide a longer ($\Delta L$ +50/0) or a shorter ($\Delta L$ −50/0) physical path-length.

Such embodiments can facilitate changing the physical light path-lengths through the two waveguide arms, which as disclosed in the context of FIG. 8A-8C, can surprisingly facilitate providing both fine and coarse wavelength tuning of wavelength where the filter 102 exhibits athermal behavior.

FIG. 8A presents exemplary fine tuning of resonance shift curves versus carrier frequency for a temperature change of 10° K for an example apparatus 100 having a filter design analogous to that depicted in FIG. 7. For the purposes of illustration a reference resonance shift curve (ΔL 0/0) is presented. The reference resonance shift curve corresponds to an arbitrary reference total physical path-length (e.g., about 5000 to 20000 microns in some embodiments) and physical path length difference (e.g., about 500 to 5000 microns in some embodiments) between first and second waveguide arms 117, 120 for an arbitrary combination of physical path-lengths obtained by selecting an arbitrary combination of discrete waveguide portions. A first example fined-tuned curve (ΔL +250/+250) corresponds to a scenario where the total physical path-lengths in the first and second waveguide arms 117, 120 have both been increased by a same amount by tuning to select a combination of discrete waveguide portions to provide a 250 micron longer path-length. A second example fined-tuned curve (ΔL −250/−250) corresponds to a scenario where the total path-lengths in the first and second waveguide arms 117, 120 have both been decreased by a same amount by tuning to select a combination of discrete waveguide portions to provide a 250 micron shorter path-length.

FIG. 8A illustrates that for some such embodiments, by changing the physical path-lengths of both of the waveguide arms 117, 120 by a same amount, e.g., by tuning to select discrete waveguide portions in both waveguide arms, while keeping difference in the path-length between the arms constant, but still change the relative physical path-length difference between the arms, the resonance frequency at which athermal behavior occurs can be shifted by relatively small incremental amounts (e.g., about ±0.5 THz for a ±250 micron path-length change).

FIG. 8B presents exemplary coarse tuning of resonance shift curves versus carrier frequency for a temperature change of 10° K for an example apparatus 100 having a filter design analogous to that depicted in FIG. 7. The reference resonance shift curve (ΔL 0/0) corresponds to the same total physical path-lengths and physical path-length difference as described in the context of FIG. 8A. A first example coarse-tuned curve (ΔL 0/−50) corresponds to a scenario where the total physical path-length in the first waveguide arm 117 having the wider core width has not been changed as compared to the reference, and, the total physical path-length in the second waveguide arm 120 with the narrower core width has been decreased by tuning to select discrete waveguide portions to provide a 50 micron shorter path-length. A second example coarse-tuned curve (ΔL 0/+50) corresponds to a scenario where again, the total physical path-length in the first waveguide arm 117 has not been changed as compared to the reference, and, the total physical path-length in the second waveguide arms 120 has been increased by tuning to select discrete waveguide portions to provide a 50 micron longer path-length. As illustrated, increasing the physical path-length of the narrower core width waveguide arm 120 red-shifts the athermal wavelength range, while decreasing the path-length blue-shifts the athermal wavelength range.

FIG. 8C presents additional exemplary coarse tuning of resonance shift curves versus carrier frequency for a temperature change of 10° K for an example apparatus 100 having a filter design analogous that depicted in FIG. 7. The reference resonance shift curve (ΔL 0/0) corresponds to the same total physical path-lengths and physical path-length difference as described in the context of FIG. 8A. A first example coarse-tuned curve (ΔL +50/0) corresponds to a scenario where the total physical path-length for the second waveguide arm 120 has not been changed as compared to the reference, and, the total physical path-length for the wider core first waveguide arm 117 has been increased by tuning to select discrete waveguide portions to provide a 50 micron longer path-length. A second example coarse-tuned curve (ΔL −50/0) corresponds to a scenario where again, the total physical path-length in the second waveguide arm 117 has not been changed as compared to the reference, and, the total physical path-length in the second waveguide arm 120 has been decreased by tuning to select discrete waveguide portions to provide a 50 micron shorter path-length. As illustrated, increasing the physical path-length of the wider core width waveguide arm blue-shifts the athermal wavelength range, while decreasing the path-length red-shifts the athermal wavelength range.

FIGS. 8B and 8C illustrates that for some embodiments, by changing the physical path-lengths of one of the waveguide arms 117, 120, e.g., by tuning to select discrete waveguide portions in one of the waveguide arms, the resonance frequency at which athermal behavior occurs can be shifted by relatively large incremental amounts (e.g., about ±5 THz for a ±50 micron path-length change).

Based on the examples presented in FIGS. 8A-8C, one skilled in the pertinent arts would understand how the selection of waveguide portions to change the total physical light path-length both of waveguide arms 117, 120 and the difference in physical path-length between the arms 117, 120 could provide a brad range of tuning options for adjusting the wavelength at which athermal behavior occurs.

As noted in the context of FIGS. 1-2B, as part of providing athermal filter behavior, at least a portion of one of the two waveguide arms has a narrower core width than a wider core width of the other waveguide arm. For instance, in some embodiments, the wider core width 210 can have a width value in a range from about 300 to about 1000 nanometers and the narrower core width 215 can have a width value that is in a range from about 0.4 to 0.6 times the width value of the wider core width 210.

As previously noted, the waveguide arm with the longest waveguide portion having the narrower core width also has the longest total physical path-length of the two waveguide arms. In some such embodiments the waveguide arm with the longest total physical path-length of the two waveguide arms includes a first fixed extension portion. For instance, as illustrated in FIGS. 1, 4, 6 and 7, in some embodiments, the second waveguide arm 120 having the narrower second core width 216 has the longest total physical path-length. In some such embodiments, as illustrated, the second waveguide arm 120 can include a fixed (e.g., non-tunable) first extension portion 160 to facilitate the second arm 120 having a longer physical path-length than the first arm 117. As also illustrated, in some embodiments, the first extension portion 160 can be part of the fixed first waveguide portion 123 that is configured to receive light exiting the optical splitter 107 and guide the light to the second waveguide portion 124 having the narrower core width (in FIGS. 1, 4 and 6), and in some embodiments, to a first one of the discrete optical switches 740 coupled to first ones of the discrete portions of the set 750 (FIG. 7). Similarly, as illustrated in FIGS. 3 and 5, the first fixed portion 122 of first waveguide arm 117 having the narrower core width can further includes the first extension portion 160.

In some embodiments, the presence of the first waveguide extension portion 160 in the first waveguide length portion (e.g., portion 123 in FIGS. 1, 4, 6 and 7 or portion 122 in FIGS. 3 and 5) accounts for the majority (e.g., provides at least half) of the total physical path-length difference between the first waveguide arm 117 and the second waveguide arm 120.

For instance, consider an embodiment of the interferometer 115 where the total physical path-length difference between the first waveguide arm 117 and the second waveguide arm 120 equals $\Delta L_{total}$ and the physical path-length of the first waveguide extension portion 160 equals $\Delta L0$. In some such embodiments, $\Delta L0$ equals a percent value range from greater than about 50 percent to about 100 percent of the value of $\Delta L_{total}$.

As a non-limiting example, consider an embodiment of the interferometer 115, configured as shown in FIG. 7, where $\Delta L_{total}$ equals about 1000 microns. In some such embodiments, $\Delta L0$ can range from about 50 microns to 500 microns and in some embodiments from to about 500 microns to 1000 microns. Based upon the present disclosure, one skilled in the pertinent art would understand how the selection of a specific value for $\Delta L0$ would depend upon on the specific difference in the waveguide core widths of the first and the second waveguide arms as well as the specific lengths of the portions of the first and the second waveguide arm that can be selected via the optical switches.

Continuing with the same example, in some such embodiments, the contribution to $\Delta L_{total}$ from the tunably selectable discrete waveguide portions can range from zero (e.g., no difference in the path-length through the discrete waveguide portions of the first and second arms) to about ±350 micron (e.g., the path-lengths through the pairs 750, 752, 754 of discrete waveguide portions of the second waveguide arm 120 each equal L1 and the path-lengths through the pairs 150, 152, 154 of discrete waveguide portions of the first waveguide arm 117 equal L1+$\Delta$L1, L1+2$\Delta$L1 and L1+4$\Delta$L1, respectively, and $\Delta$L1 equals 50 microns). In one such embodiment, a path-length increment, $\Delta L0$, equal to 500 microns would contribute from about 100 percent (e.g., if there was no difference in the path-lengths through the discrete waveguide portions of the first and second arms) to about 59 percent (e.g., for a 350 micron path-length difference through the discrete waveguide portions of the first and second arms) to the value of $\Delta L_{total}$.

Providing different total path-lengths for the different light portions traveling through the two waveguide arms 117, 120 can facilitate the filter 102 having the desired athermal behavior at a particular target wavelength range. In some embodiments, providing the majority of the difference in path-lengths two waveguide arms 117, 120 via the first waveguide extension portion 160 length $\Delta L0$ can facilitate shifting filter's resonance frequency such that athermal behavior occurs at about the desired wavelength range. Then fine and/or coarse tuning can be performed, such as described in the context of FIGS. 8A-8C, to compensate for fabrication errors that cause variations away from the specific desired range of wavelength with athermal behavior.

In some embodiments, the two waveguide arms each include second fixed extension portions that have substantially a same physical path-length and that contribute at least half total physical path-lengths of the respective arms. For instance, illustrated in FIGS. 1 and 2-7, first and second waveguide arms 117, 120 can further include another, and in some embodiments, additional, fixed (e.g., non-tunable) second waveguide extension portion 170, 175. Such additional extension portions 170, 175 can facilitate providing a constant free spectral range (FSR; e.g., about 100, 50 or 25 GHz in some embodiments) for the wavelength range of interest and providing athermal behavior over such a broad wavelength range.

In some such embodiments, the second fixed extension portion (e.g., extension portion 175 in FIG. 1 or extension portion 170 in FIG. 3) that is part of the waveguide arm with the longest total physical path-length also has narrower core width and the second fixed extension portion (e.g., extension portion 170 in FIG. 1 or extension portion 175 in FIG. 3) that is part of the other waveguide arm has wider core width.

As illustrated, in some embodiments, the second waveguide extension portions 170, 175 have substantially a same physical path-length as each other (e.g., the same within ±1, ±0.1, ±0.01 or ±0.001 percent in various different embodiments). As illustrated, in some embodiments, the second waveguide extension portions 170, 175 have different core widths.

For instance, as illustrated in FIG. 7, the first waveguide arm 117 can further include a fixed second waveguide extension portion 170 (e.g., of length L2) coupling light exiting a last one of the discrete optical switches (e.g., switch 146 in some embodiments) coupled to a last one of the parallel pairs (e.g., pair 154 in some embodiments) of discrete waveguide portions of the set 130, to the optical combiner 121 of the interferometer 115. The second waveguide arm 120 can further include a corresponding fixed second waveguide extension portion 175 coupling the light exiting a last discrete optical switch (e.g., switch 746 in some embodiments) that is coupled to a last pair of discrete waveguide portions (e.g., pair 754 in some embodiments) of the second set 730 of pairs of discrete waveguide portions, to the optical combiner 121. The fixed second waveguide extension portion 170 of the first waveguide arm 117 and the corresponding second waveguide extension portion 175 of the second waveguide arm 120 can have substantially a same light path-length (e.g., a same length L2). In some embodiments, such as shown in FIGS. 1, 4, 6-7, the fixed second waveguide extension portion 170 of the first waveguide arm 117 has a wider core width (e.g., similar to first core width 210) and the corresponding fixed second waveguide extension portion 175 of the second waveguide arm 120 has the narrower second core width (e.g., similar to second core width 215). In some embodiments, such as shown in FIGS. 3 and 5, the fixed second waveguide extension portion 170 of the first waveguide arm 117 has the narrower core width (e.g., similar to second core width 215) and the corresponding fixed second waveguide extension portion 175 of the second waveguide arm 120 has the narrower second core width (e.g., similar to first core width 210).

In some embodiments, the fixed second waveguide extension portion 170 and the corresponding fixed second waveguide extension portion 175 contributes at least half of the total physical path-lengths of first and second waveguide arms 117, 120, respectively. For instance, in some embodiments, the length of the fixed second waveguide extension portion 170 equals a percentage value ranging from greater than about 50 percent to about 99 percent of the total physical light path-length through the first waveguide arm 117. For instance, in some embodiments, the length of the corresponding fixed second waveguide extension portion 175 equals a percentage value ranging from about 85 percent to about 95 percent of a total physical light path-length through the second waveguide arms 120.

For instance, consider an example embodiment of an apparatus 100 similar to that disclosed in FIG. 7 where the total physical path-length through the first waveguide arm 117 equals 9500 microns and the total physical path-length through the second waveguide arm 120 equals about 9000 microns (e.g., $\Delta L_{total}$ equals about 500 microns). In some such embodiments, when the length of the fixed second waveguide extension portion 170 and the corresponding fixed second waveguide extension portion 175 both equal about 5000 microns, then these portions 170, 175 contribute about 52 and 55 percent of the total path-length of the first and second waveguide arms 117, 120, respectively. In some such embodiments, when the length of the fixed second waveguide extension portion 170 and the corresponding fixed second waveguide extension portion 175 both equal about 8500 microns, then these portions 170, 175 contribute about 89 and 94 percent of the total path-length of the first and second waveguide arms 117, 120, respectively.

In some embodiments, as illustrated in FIG. 1, the waveguide arms 117, 120 can further include variable optical attenuators 180, 182 integrated therein. The variable optical attenuators can be adjusted to balance the optical power in the waveguide arms 117, 120 e.g., to facilitate having a maximum extinction ratio. Any of the embodiments of the filter 102 (e.g., such as depicted in FIGS. 3-7) can optionally include such variable optical attenuators 180, 182 integrated within the waveguide arms 117, 120.

Figure 10:
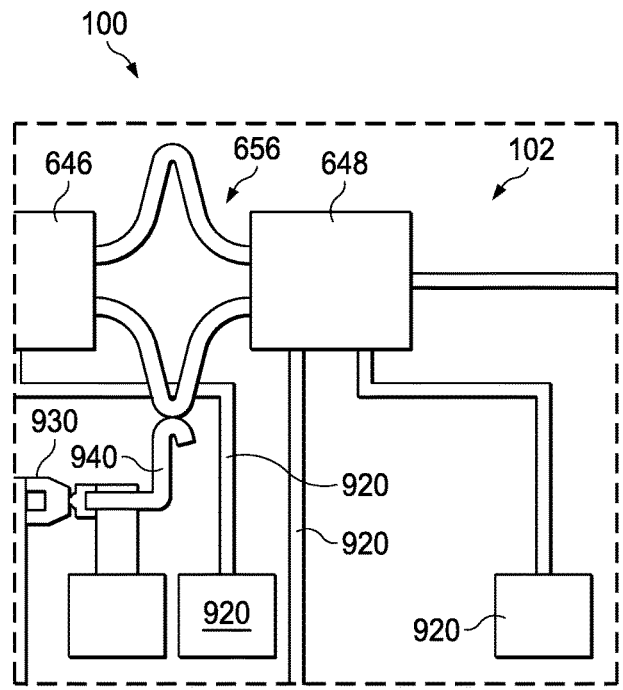
FIG. 10 presents a detail view of a portion of the optical photonic circuit presented in FIG. 8.

FIG. 9 presents an exemplary optical photonic circuit apparatus 100 (e.g., photonic integrated circuit) that includes an example reconfigurable athermal optical filter 102 analogous to that depicted in FIG. 7. FIG. 10 presents a detail view of a portion of the optical photonic circuit apparatus 100 presented in FIG. 9.

Some embodiments of the optical filter 102 can include a MZI 115 configured with 2×2 optical switches. As illustrated in FIG. 9 the apparatus 100 can further include a light input 910 coupled to the optical filter 102 (e.g., via waveguide 112). The light input 910 and the optical filter 102 are located on a photonic integrated circuit substrate 105 (e.g., a silicon photonic integrated circuit substrate) and the light input 910 can be configured to deliver the input light 110 (FIG. 1) having a wavelength in an optical telecommunication band to the optical splitter 107 of the filter 102. In some embodiments, the light input 910 can include or be an optical coupling port (e.g., a horizontal edge coupling port or a vertical edge coupling port) while in other embodiments the light input can be or include a light source such as a cavity laser, pumped laser, laser diode, or hybrid laser, distributed feedback (DFB) laser. As further illustrated in FIG. 9, some embodiments of the apparatus 100 can further include a light output 912, such as a second an optical coupling port.

One skilled in the pertinent art would understand how the filter 102, could be tuned to provide thermal behavior at a target optical telecommunication wavelength band. For example, embodiments of the filter could be tuned to provide athermal behavior at a wavelength within any one of the common optical telecommunication bands, including the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675) bands.

As illustrated in FIGS. 9 and 10, embodiments of the apparatus 100 can further include discrete including discrete electrodes 920 located on the photonic integrated circuit substrate 105 (e.g., metal electrodes formed on the substrate 105) and coupled to the optical switches 140, 142 . . . . Each of the electrodes 920 can be configured provide an electrical signal to control a direction of transit of the input light 110 through one of the discrete waveguide portions 132, 134, . . . . For instance, one skilled in the pertinent art would understand how to use such electrodes to control a phase shifter (e.g., thermo-optic, liquid crystal, electro-optic effects, magneto-optic phase shifters) in a MZI switch, or move mirrors or lens in a MEMS switch, so as to direct the light through the switch to a selected one of the waveguide portions.

As also illustrated in FIGS. 9 and 10, to facilitate keeping track of the state of each of the optical switches 140, 142, . . . to allow deterministic optical path selection, the apparatus 100 can further include discrete optical power monitors 930. For instance, the optical power monitors 930 can be optically connected (e.g., via tap waveguides 940) to at least one of the discrete waveguide portions (e.g., portions 132, 134, . . . , or portions 732, 734, . . . , in FIG. 7) for each of the different pairs of tunable waveguide portions (e.g., pairs 150, 152, . . . ) in the first waveguide arm 117 and the pairs (e.g., pairs 750, 752, . . . ), in the second waveguide arm 120.

Figure 11:
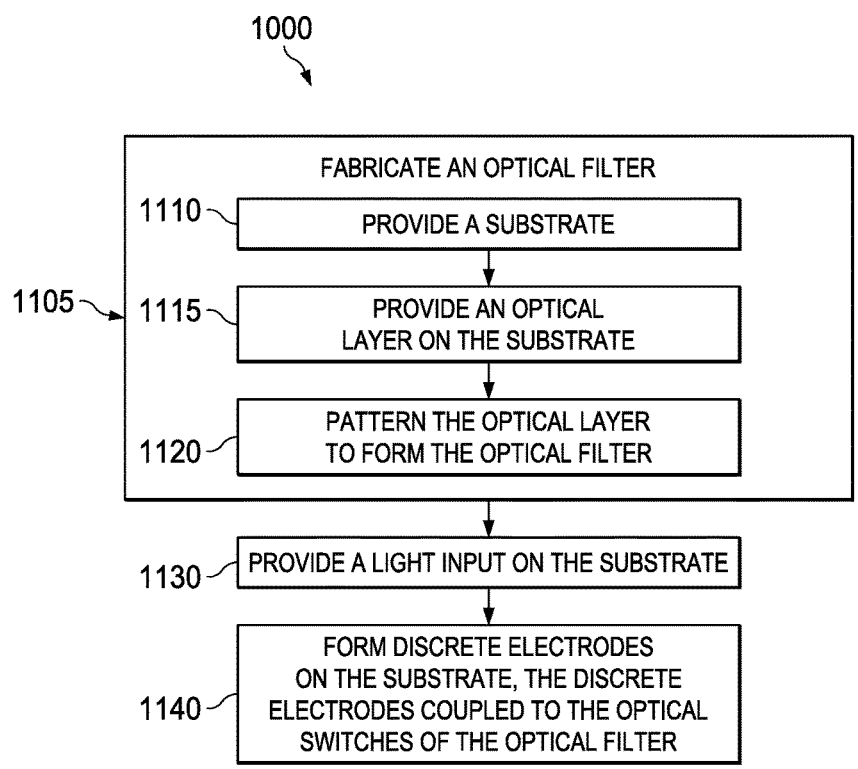
FIG. 11 presents a flow diagram of an example method of manufacturing an apparatus of the disclosure, such as any of the example apparatuses described in the context of FIGS. 1-10.

Another embodiment of the disclosure is a method of manufacturing an apparatus. FIG. 11 presents a flow diagram of an example method 1100 of manufacturing an apparatus of the disclosure, such as any of the example apparatuses 100 described in the context of FIGS. 1-10.

As illustrated in FIG. 11, with continuing reference to FIGS. 1-10 throughout, the method 1100 comprises a step 1105 of fabricating an optical filter 102. Fabricating the filter (step 1105) can include a step 1110 of providing a substrate 105 and a step 1115 of providing an optical layer on the substrate. In some embodiments, as part of step 1115, the optical layer can be provided as part of a layer on the substrate (e.g., in some embodiments, a silicon-on-insulator substrate have a silicon optical layer 220 and buried oxide layer 230 located on a bulk silicon layer 240, e.g., as illustrated in FIGS. 2A-2B). In other embodiments, as part of step 1115, the optical layer can be deposited on the substrate using procedure familiar to those in the pertinent art.

Fabricating the filter (step 1105) can include a step 1120 of patterning the optical layer 220 to form the optical filter 102. The patterning step 1120 can form any of the embodiments of the filter's component parts, including the splitter 107, the interferometer 115 including the interferometer's waveguide arms 117, 120, the discrete waveguide portions 132, 134 . . . , 732, 734 . . . and the optical switches 140, 142 . . . , 740, 742, . . . , or other optical components of the filter 102 (e.g., the optical combiner 121, coupling waveguides 112, tap waveguides 940) as described in the context of FIGS. 1-9. Embodiments of the patterning step 1120 can include conventional lithographic and etching procedures familiar to those skilled in the pertinent art to remove portions of the optical layer 220 laying outside of the optical splitter 107, waveguide arms 117, 120 or other optical components of the apparatus 100.

In some embodiments, to reduce the variability in the dimension of the waveguide arms 117, 120 and other optical component formed in the patterning step 1120, the thickness 250 of the optical layer 220 (FIGS. 2A-2B) is preferably highly uniform. In some embodiments, as non-limiting examples, the waveguide arms 117, 120 can have a uniform thickness 250 of about 200 nanometers, 300 nanometers or 400 nanometers and in some embodiments the thickness 250 is the same across the lengths of the waveguide arms and between the arms within ±5 percent, or, in some embodiments, within ±1 percent or less, or, in some embodiments, within ±0.5 percent.

Some embodiments of the method 1100 further include a step 1130 of providing a light input 910 on the substrate 105. The light input 910 can be configured to deliver the input light 110 having a wavelength in an optical telecommunication band to the optical splitter 107. One skilled in the pertinent art would be familiar with procedures for, e.g., patterning the optical layer 220 (e.g., to form mirrors, lens, gratings etc. . . . ) and/or depositing or growing semiconductor materials on the substrate as part of constructing the light input.

Some embodiments of the method 1100 can further include a step 1140 of forming discrete electrodes 920 on the substrate 105, the discrete electrodes 920 coupled to the optical switches of the optical filter 102. Each of the electrodes 920 can be configured to provide an electrical signal to control a direction of transit of the input light 110 through one of the discrete waveguide portions 132, 134 . . . . The discrete electrodes 920 can be configured to read a photocurrent from optical power monitors located inside the switches.

In some embodiments, step 1140 can include a forming a metal layer (e.g., a metal electrode contact) on the optical layer 220, e.g., via physical or vapor deposition, electro-deposition, electroless or similar process familiar to one skilled in the pertinent art. The metal layer can be formed in patterns such as presented in FIGS. 9-10 so as to contact the switches 140, 142, . . . , and, to provide wire landing pad electrodes on the substrate 105 to facilitate connection to control circuitry located external to the substrate 105 or at a different location on the same substrate. Additional metal layers can be formed and patterned to serve as electrodes to providing electric currents as part of, e.g., providing thermo-optic control of the switches.

Although the present disclosure has been described in detail, those skilled in the art should understand that they can make various changes, substitutions and alterations herein without departing from the scope of the invention.

What is claimed is:

1. An apparatus, comprising:
an optical filter located on a substrate, the optical filter including:
an optical splitter configured to receive an input light; and
an interferometer having two waveguide arms having different optical path-lengths from each other, the two waveguide arms configured to receive the input light from the optical splitter, wherein:
at least a portion of one of the two waveguide arms has a narrower core width than a wider core width of the other waveguide arm,
the waveguide arm with the longest waveguide portion having the narrower core width has the longest total physical path-length of the two waveguide arms,
at least one of the two waveguide arms has a set of discrete waveguide portions, the discrete waveguide portions of the set being connected by optical switches which are configured to tunably select from a plurality of different physical path-lengths through the discrete waveguide portions of the at least one waveguide arm; and
a plurality of discrete electrodes on the substrate, wherein a discrete electrode from the plurality of discrete electrodes is coupled to a respective optical switch and is configured to provide an electrical signal to control a direction of transit of the input light through one of the discrete waveguide portions.

2. The apparatus of claim 1, wherein:
a first waveguide arm of the two waveguide arms is the waveguide arm having the set of discrete waveguide portions, and
a second waveguide arm of the two waveguide arms has the narrower core width which also has the longest waveguide portion having the narrower core width.

3. The apparatus of claim 1, wherein:
a first waveguide arm of the two waveguide arms is the waveguide arm having the set of discrete waveguide portions,
the first waveguide arm has the longest waveguide portion having the narrower core width, and
a second waveguide arm of the two waveguide arms has a first portion having the narrower core width and a second portion having the wider core width.

4. The apparatus of claim 1, wherein the set of discrete waveguide portions includes a first pair of the discrete waveguide portions.

5. The apparatus of claim 1, wherein the set of discrete waveguide portions further includes multiple different pairs of discrete waveguide portions that are series connected together by different pairs of the optical switches.

6. The apparatus of claim 5, wherein each one of the pairs of discrete waveguide portions of the sets include a first portion having a same first physical path-length and a second portion having a unique second physical path-length that is greater than the same first physical path-length and different from the second light path-lengths of other ones of the pairs of the sets.

7. The apparatus of claim 1, wherein the other of the two waveguide arms includes a second set of discrete waveguide portions, the discrete waveguide portions of the second set connected together by different optical switches which are configured to tunably select from one of a plurality of different physical path-lengths through the discrete waveguide portions of the other waveguide arm.

8. The apparatus of claim 7, wherein the second set of discrete waveguide portions further includes multiple different pairs of the discrete waveguide portions that are series connected together by different ones of the optical switches.

9. The apparatus of claim 1, wherein the wider core width has a width value in a range from about 300 to about 500 nanometers and the narrower core width has a width value that is in a range from about 0.4 to about 0.6 times a value of the wider core width.

10. The apparatus of claim 1, wherein:
the waveguide arm with the longest total physical path-length of the two waveguide arms includes a first fixed extension portion that provides at least half of the total physical path-length difference between the waveguide arm and the other waveguide arm.

11. The apparatus of claim 10, wherein the first fixed extension portion provides from greater than about 50 percent to about 100 percent of the total physical path-length difference between the waveguide arm with the longest total physical path-length and the other waveguide arm.

12. The apparatus of claim 1, wherein:
the two waveguide arms each include second fixed extension portions that have substantially a same physical path-length and that contribute at least half total physical path-lengths of the respective arms.

13. The apparatus of claim 12, wherein the same physical path-length of the second fixed extension portions contribute a percentage value ranging from greater than about 50 percent to about 90 percent of the total physical path-length of the respective arms.

14. The apparatus of claim 1, further including a light input coupled to the optical filter, the light input and the optical filter located on a photonic integrated circuit substrate and the light input is configured to deliver the input light having a wavelength in an optical telecommunication band to the optical splitter.

15. The apparatus of claim 14, wherein the light input includes an optical coupling port or a light source.

16. A method, comprising:
fabricating an optical filter, including:
providing a substrate;
providing an optical layer on the substrate;
patterning the optical layer to form the optical filter, including:
forming an optical splitter configured to receive an input light; and
forming an interferometer having two waveguide arms with different optical path-lengths, the waveguide arms configured to receive the input light from the optical splitter, wherein:
at least a portion of one of the two waveguide arms has a narrower core width than a wider core width of the other waveguide arm,
the waveguide arm with the longest waveguide portion having the narrower core width has the longest total physical path-length of the two waveguide arms, and
at least one of the two waveguide arms has a set of discrete waveguide portions, the discrete waveguide portions of the set being connected by optical switches which are configured to tunably select from a plurality of different physical path-lengths through the discrete waveguide portions of the at least one waveguide arm; and
forming a plurality of discrete electrodes on the substrate, wherein a discrete electrode from the plurality of discrete electrodes is coupled to a respective optical switch and is configured to provide an electrical signal to control a direction of transit of the input light through one of the discrete waveguide portions.

17. The method of claim 16, wherein patterning to form the optical filter includes patterning the other of the two waveguide arms to form a second set of discrete waveguide portions, the discrete waveguide portions of the second set connected together by different optical switches which are configured to tunably select from one of a plurality of different physical path-lengths through the discrete waveguide portions of the other waveguide arm.

18. The method of claim 16, further including providing a light input on the substrate, the light input configured to deliver the input light having a wavelength in an optical telecommunication band to the optical splitter.

* * * * *